Patented Jan. 6, 1942

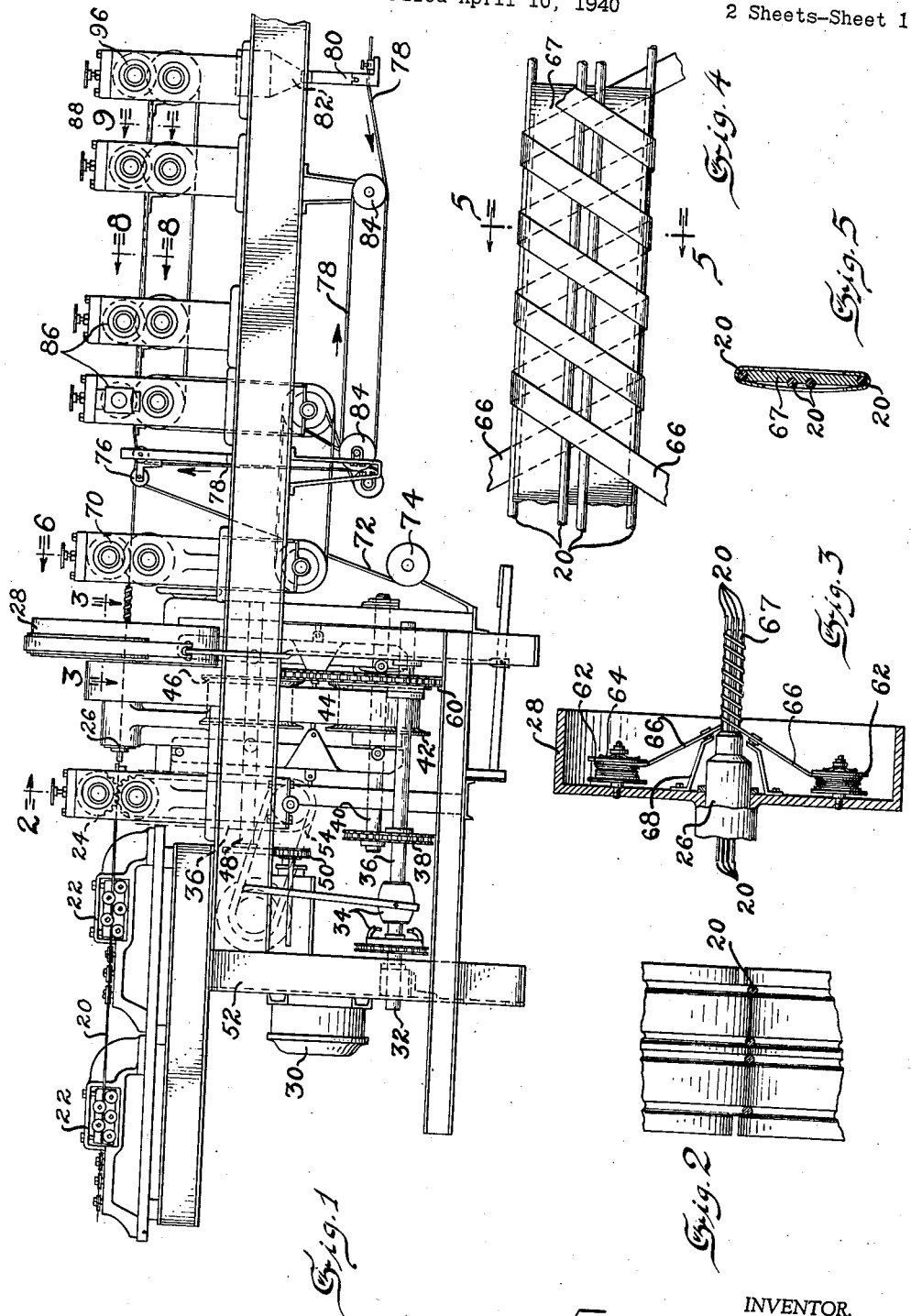
Jan. 6, 1942.  G. T. BALFE  2,268,562
PROCESS OF AND APPARATUS FOR FABRICATING GLASS RUN GUIDES
Filed April 10, 1940  2 Sheets-Sheet 1
INVENTOR.
GEORGE T. BALFE
BY Parker & Burton
ATTORNEYS.

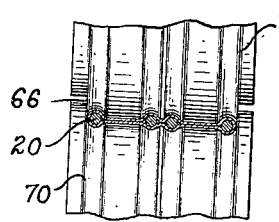
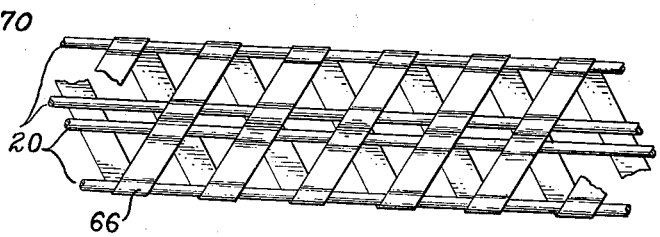
Fig. 6  Fig. 7
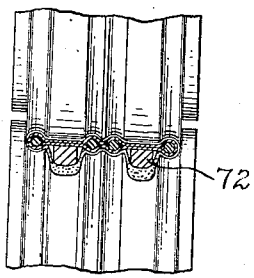
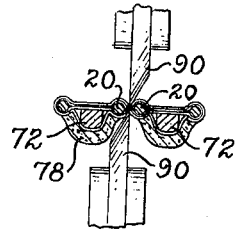
Fig. 8  Fig. 9
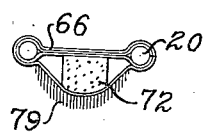
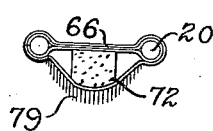
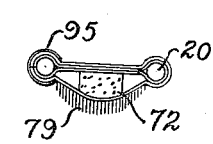
Fig. 10  Fig. 11

2,268,562

UNITED STATES PATENT OFFICE 2,268,562

PROCESS OF AND APPARATUS FOR FABRICATING GLASS RUN GUIDES

George T. Balfe, Detroit, Mich., assignor to Detroit Gasket & Manufacturing Company, Detroit, Mich., a corporation of Michigan Application April 10, 1940, Serial No. 328,928

14 Claims. (Cl. 140—71)

This invention relates to improvements in a process of and apparatus for fabricating glass run guides and particularly guides having an open work metallic mesh insert surrounded by covering cushioning material.

An object is to provide an improved process and improved apparatus for rapidly and economically fabricating glass run guides of the character described.

More particularly an object is to fabricate a multiplicity of metallic insert strips as an integral unit and as a continuing operation this unit is surrounded with suitable covering material and thereafter and as a continuing part of said process the covered unit is severed along a line separating it into a plurality of covered glass run guide strips. Each of these strips constitutes a glass run guide having a metallic insert surrounded with covering cushioning material.

An important feature comprises linearly advancing a plurality of pairs of supporting wires substantially in parallelism and substantially in the same plane. Mesh forming strand wires of desired cross-sectional size and shape are wrapped about said plurality of pairs of supporting wires as a unit and during the advance thereof forming a wire mesh strip. Covering cushioning material is wrapped and secured about said entire wire mesh strip. Thereafter said covered mesh unit strip is severed along a line between adjacent pairs of supporting wires forming a plurality of separate glass run guide strips each including a pair of supporting wires and mesh forming wire strands extending therebetween.

A further meritorious feature is that the mesh forming strand wires are crimped about the supporting wires between the two supporting wires of each pair and between the adjacent pairs of supporting wires to maintain the supporting wires of each pair in spaced apart relationship. The covering material is adhesively secured together through the mesh formed by the strand wires between the two supporting wires of each pair and about the supporting wires. A metallic bead is folded over that longitudinal margin of the guide and its supporting wire along which the mesh strands have been severed gripping the mesh strands against said supporting wire.

Other objects, advantages and meritorious features of this invention will more fully appear from the following description, appended claims and accompanying drawings, wherein:

Figure 1 illustrates a type of machine or mechanism which is adaptable to carry out the process described, Fig. 2 is a fragmentary cross-sectional view taken on line 2—2 of Fig. 1, Fig. 3 is a fragmentary cross-sectional view on line 3—3 of Fig. 1, Fig. 4 is a fragment of a plan of the wire mesh unit as it passes over the guide plate 67, Fig. 5 is a cross-sectional view taken on line 5—5 of Fig. 4, Fig. 6 is a fragmentary cross-sectional view on line 6—6 of Fig. 1, Fig. 7 is a plan of a fragment of a plan of the wire mesh unit after the same has passed through the rollers shown in Fig. 6, Fig. 8 is a fragmentary cross-sectional view taken on line 8—8 of Fig. 1, Fig. 9 is a fragmentary cross-sectional view taken on line 9—9 of Fig. 1, Fig. 10 is a vertical sectional view through the two formed guide strips which are shown in Fig. 9 as being separated, and Fig. 11 is a cross sectional view taken on the same line as Fig. 10 and showing a metal bead crimped about one of the longitudinal edges of the strip.

The machine would be suitably supported upon a floor by standards not shown and comprises the following operating mechanisms. From suitably rotatably supported spools, which are not shown, two pairs of relatively heavy supporting wires 20 are fed through two wire straightening mechanisms of conventional type indicated generally as 22 in Fig. 1 at the forward end of the machine. These supporting wires then pass through conventional feed or drag roll mechanism 24 on the machine (Fig. 1) and from there pass through the stationary spindle or axis 26 (Figs. 1 and 3) of winding drum 28.

Any suitable driving mechanism may be provided but in the machine shown in Fig. 1 there is a motor 30 which drives a shaft 32 in any suitable manner. Clutch mechanism 34 is provided whereby shaft 36 may be clutched to this drive shaft 32. This shaft 36 through a sprocket chain 38 and suitable sprockets drives shaft 40. The shaft 40 carries a pulley 42 which through belt 44 drives through pulley 46 shaft 48, which shaft is shown partly in dotted outline. Through sprocket chain 50 and suitable sprockets this shaft 48 drives a reducing mechanism indicated generally as 52 which reducing mechanism through sprocket drive chains 54 and 56 and suitable sprockets drives the drag or feed mechanism 24 hereinabove referred to.

The shaft 36 through a suitable sprocket and drive chain 60 drives the winding drum 28. Drag chain 60 extends into a casing at the rear of the drum and this conventional construction is not shown but is easily understood. No claim is made to the detail of this particular driving mechanism as any type might be provided.

The winding drum 28 is shown more in detail in Fig. 3. It is a cup-shaped drum as there shown and carries a plurality of wire spools 62, two of which are shown in Fig. 3. These spools are supported for rotation as there illustrated. A spring drag member 64 may be provided to impose a resistance to rotation of the spool so that the supporting strand wires 66 wound upon such spools and adapted to be unwound therefrom as the machine operates will be drawn off in a taut condition and as desired for use. The supporting strand wires may be flat wire strips as shown at 66 in Fig. 4 or may be wires of any cross-sectional shape. Guide elements 68 are provided to guide these mesh wires so that they will be wrapped about the supporting wires 20 as the supporting wires are advanced by the said rolls through the stationary spindle about which the winding drum revolves.

It will be noted that these strand wires overlap each other and are wrapped about the two pairs of supporting wires 20 as a unit in a spiral manner. There is a flat guide plate 67 which forms a continuation of the stationary axis or spindle of the winding drum and which is shown more particularly in Fig. 5 and which forms a guide for the supporting wires 20. This guide plate is grooved along its margins to form a seat or channel for the two outermost supporting wires and extends therebetween spacing them apart as shown. The guide plate is provided with two spaced apart parallel grooves in its upper face within which the two innermost supporting wires 20 are adapted to seat so that the four supporting wires are held in the proper aligned spaced apart parallel relationship thereby as the mesh forming strand wires 66 are wrapped thereabout and pulled thereover as shown particularly in Figs. 3 and 5.

At 70 are indicated forming or shaping rolls which are more particularly shown in Fig. 6. These shaping rolls disposed adjacent the end of guide plate 67 are adapted to crimp the strand wires about the supporting wires and between them as shown in Fig. 6. As the supporting wires and strand wires of the mesh are fed forwardly and as the mesh leaves the guide plate 67 the strand wires are crimped about the two supporting wires in each pair and between the two innermost wires of the two pairs as shown in Fig. 6 and a wire mesh unit as shown in Fig. 7 is formed as a result of this operation.

This wire mesh unit feeds forwardly from the shaping rolls 70 and is wrapped with cushioning covering material as hereinafter set forth. This cushioning covering material comprises a linear cushion pad 72 in strip form (Figs. 1, 8, 9 and 10). It is brought upwardly from a spool 74 upon which it is wound and passes over guide rollers 76 underneath the advancing mesh strip and is brought into overlying relationship with the adhesive coated surface of a strip of covering cloth 78.

This covering cloth is supported upon a spool not shown but feeds from such spool underneath a conventional pasting device indicated generally as 80. Adhesive is supported in a tank 82 shown in dotted outline at the right of Fig. 1 and feeds downwardly therefrom and is spread upon the back surface of the covering cloth 78. This cloth may be provided with pile 79 upon the opposite surface as shown in Fig. 10. The cloth is then carried over a series of rollers such as 84 so that the adhesive will dry to a tacky state. The cloth is then fed upwardly to the guide rolls 76 where the strip of cushioning material is brought into contact with it and adheres thereto. Two pad strips 72 will be fed up from two rollers 74 and these strips will be brought into contact with the covering cloth spaced apart so that there will be one strip for each pair of supporting wires 20.

The covering material has each margin folded over on top of the advancing wire mesh unit as it passes through the folding mechanism indicated generally as 86. These folding devices are well understood in the art and the two margins of the covering material are brought together along the median line of the mesh unit on the top side between the two innermost supporting wires 20 and this covering material is pressed down firmly against and between the supporting wires and the mesh forming strands so that its folds adhere together through the spaces between the supporting wires and the mesh forming strands as shown particularly in Fig. 8.

As the covered strip advances from these folders 86 it passes through a cutting device indicated generally as 88 and shown somewhat more in detail in Fig. 9. Rotatable opposed cutters 90 are provided which sever the dual strip between the two innermost supporting wires 20 cutting through the covering material and the strand wires 66. As a result of this severing operation there are provided two similar covered guide strips indicated generally in Fig. 10. Each of these guide strips has a longitudinal wire 20 extending along its margin. Wrapped about the supporting wires are the mesh forming strands 66. These mesh forming strands are cut in two but the cut over ends are folded down along the outside of one supporting wire and the opposed margins of the covering strip are likewise wrapped thereover as shown in Fig. 10. The two separated guide strips then pass through rollers 96 which press closely about the contour of the margins of the strips so as to give shape and form to the margins and to seal the edges of the covering material.

In the complete formation of the strip there is then folded about the margin of each innermost supporting wire and over the severed ends of the strands and the severed margins of the covering material a metal bead which is shown in my companion case directed to the guide strip per se of this same inventor filed under this same date and which is indicated in Fig. 11 at 95, such companion case being Serial No. 328,929, filed April 10, 1940.

What I claim:

1. That method of fabricating a glass run guide which comprises forming a metallic mesh consisting of at least two adjacent pairs of supporting wires extending linearly in substantially the same plane and having mesh forming wire strands wrapped about said two pairs of supporting wires as a unit, wrapping covering material about said wire mesh unit and securing the same together between the mesh forming wires and between the supporting wires, and severing said covered wire mesh unit along a line between said two pairs of supporting wires forming two covered wire mesh guide strips.

2. That method of fabricating a glass run guide which comprises forming and linearly advancing a metallic mesh containing of at least two adjacent pairs of supporting wires having mesh forming metallic strands wrapped about said plurality of pairs of supporting wires as a unit, wrapping and securing covering material about said mesh unit as it is advanced, severing said covered mesh unit as it is advanced along a line between said two adjacent pairs of supporting wires and bending said severed mesh wires and margins of covering material about the two supporting wires adjacent said line of severance forming two covered wire mesh guide strips.

3. That method of fabricating a glass run guide which comprises linearly advancing a plurality of pairs of supporting wires substantially in parallelism, wrapping a plurality of mesh forming metallic strands about said plurality of pairs as a unit and during the advance thereof forming a flat mesh unit strip, wrapping and securing covering material about said unit mesh strip as it is advanced, severing said covered unit strip as it is advanced along a line between said pairs of supporting wires forming a plurality of individual covered mesh strips each including a pair of supporting wires.

4. That method of fabricating a glass run guide comprising linearly advancing a plurality of supporting wires substantially in parallelism and substantially in the same plane and arranged in a plurality of adjacent pairs, wrapping a plurality of mesh forming metallic strands about said plurality of pairs of supporting wires as a unit and as they are advanced forming a flat mesh strip, folding and securing covering material about said mesh as it is advanced and securing the folds of said covering material together between the mesh forming strands and between the supporting wires, bending the mesh forming wire strands about and between the supporting wires of each pair as the strip is advanced, severing the covered mesh including the metallic strands as the mesh is advanced along a line between adjacent pairs of supporting wires dividing the covered mesh into a plurality of covered mesh strips.

5. That method of fabricating a glass run guide which includes the step of linearly advancing two pairs of supporting wires substantially in parallelism and in the same plane, wrapping mesh forming strand wire about said plurality of pairs of supporting wires as a unit and during the advance thereof forming a flat mesh strip and severing the strand wires between said two pairs of wire of the mesh strip during the advance of the strip.

6. That method of fabricating glass run guides which includes the step of linearly advancing two pairs of supporting wires substantially in parallelism and in the same plane, wrapping a plurality of mesh forming metallic strands about said plurality of pairs of supporting wires as a unit and during the advance thereof forming a flat mesh strip, wrapping and securing covering material about said mesh strip, crimping the mesh forming strand wires toward the two adjacent supporting wires between said two pairs of supporting wires, severing the strand wires between said two pairs of supporting wires and crimping the severed ends about the proximate supporting wires.

7. In mechanism of the class described, means for advancing two adjacent pairs of supporting wires linearly substantially in parallelism and in substantially the same plane including guide means arranged inwardly of and adjacent to each of the two outermost wires of said two adjacent pairs, strand wire wrapping means supported for revolution about said guide as a center adapted to wrap strand wire thereabout and over said supporting wires, means for advancing a strip of covering material into engagement with the strand wrapped supporting wires and for folding said covering material thereabout, cutter mechanism disposed in line between said two pairs of supporting wires operable to sever the strand wires and covering material between said two pairs of supporting wires.

8. In a mechanism of the class described, means for advancing two adjacent pairs of supporting wires linearly substantially in parallelism and in substantially the same plane, a flat guide plate arranged between the two outermost wires of said two pairs and having margins provided with channels adapted to receive said two wires, said plate having one flat face provided with channels to receive the two innermost supporting wires, strand wire wrapping means supported for revolution about said guide plate to wrap strand wire over the supporting wires carried thereby, cutter mechanism disposed in line with and beyond the end of said guide plate and between said two pairs of supporting wires operable to sever the strand wires between the two innermost supporting wires of said two pairs, and means engaging said strand wires between said two innermost supporting wires operable to crimp said strand wires between and about said two innermost supporting wires.

9. In mechanism of the class described, means for advancing two adjacent pairs of supporting wires linearly substantially in parallelism and in substantially the same plane, a flat guide plate arranged between the two outermost wires of said two pairs and having margins provided with channels adapted to receive said two wires, said plate having one flat face provided with channels to receive the two innermost supporting wires, strand wire wrapping means supported for revolution about said guide plate to wrap strand wire over the supporting wires carried thereby, cutter mechanism operable to sever the strand wires between said two pairs of supporting wires, and means operable to crimp said severed ends about the proximate supporting wires.

10. In mechanism of the class described, means for advancing two adjacent pairs of supporting wires linearly substantially in parallelism and in substantially the same plane, a flat guide plate arranged between the two outermost wires of said two pairs and having margins provided with channels adapted to receive said two wires, said plate having one flat face provided with channels to receive the two innermost supporting wires, strand wire wrapping means supported for revolution about said guide plate to wrap strand wire over the supporting wires carried thereby, means for advancing a strip of covering material into engagement with the strand wrapping supporting wires and for folding said covering material thereabout, cutter mechanism positioned to sever the covered strand wires between said two pairs of supporting wires, and means operable to crimp the severed covering material and strand wires about the proximate supporting wires.

11. That method of fabricating a glass run guide which includes steps of advancing as a unit a plurality of pairs of substantially parallel longitudinal supporting wires, wrapping mesh forming strand wire about said plurality of pairs of supporting wires as a unit forming a strip consisting of a plurality of pairs of longitudinal supporting wires having mesh forming strand wire wrapped thereabout, crimping the strand wire about the longitudinal supporting wires and severing the strand wire between the pairs of supporting wires.

12. That method of frabricating a glass run guide including the steps of advancing a plurality of supporting wires substantially in parallelism, wrapping strand forming wire about said plurality of supporting wires as a unit during the advance thereof forming a flat mesh strip, wrapping and adhesively securing covering material about said strip, severing the strip including the covering material and mesh forming wire along a line substantially parallel to and between a pair of said supporting wires.

13. That method of fabricating a glass run guide as defined in claim 12 characterized in that a metal strip is folded about the several longitudinal margin of the guide forming a metal bead therealong.

14. That method of fabricating a glass run guide as defined in claim 11 characterized in that a metal strip is folded about the severed longitudinal margin of the guide forming a metal bead therealong.

GEORGE T. BALFE.